United States Patent [19]

Williams

[11] Patent Number: 4,714,203
[45] Date of Patent: Dec. 22, 1987

[54] CHUTE OPERATED CONTROL FOR A FOOD PROCESSOR

[75] Inventor: James E. Williams, Stamford, Conn.

[73] Assignee: Cuisinarts Research & Development, Inc., Greenwich, Conn.

[21] Appl. No.: 382,718

[22] Filed: May 27, 1982

[51] Int. Cl.$^4$ .............................................. B02C 23/04
[52] U.S. Cl. ...................................... 241/36; 241/37.5; 241/92; 241/282.2
[58] Field of Search .............. 241/36, 37.5, 92, 282.1, 241/282.2

[56] References Cited

U.S. PATENT DOCUMENTS

| | | | |
|---|---|---|---|
| 4,043,514 | 8/1977 | Peterson, Jr. | 241/285 B X |
| 4,095,751 | 6/1978 | Artin | 241/37.5 |
| 4,396,159 | 8/1983 | Podell | 241/37.5 |

Primary Examiner—Howard N. Goldberg
Assistant Examiner—Joseph M. Gorski
Attorney, Agent, or Firm—Parmelee, Bollinger & Bramblett

[57] ABSTRACT

A continuous output food processor is provided which includes a housing having an electric motor drive and a bowl mountable on the housing for enclosing a rotary food processing tool which is rotatable within the bowl by the motor drive. A removable cover adapted to be secured in position on the bowl has a feed tube forming a passageway for feeding food items into the bowl. A chute is positioned on the bowl which is adapted to direct food processed by the food processing tool out of the bowl into a larger external container. An inclined ramp is mounted on the bowl beneath the food processing tool, said ramp extends on a downward slope toward the chute for causing food processed by the rotary tool to be deposited on the ramp to slide down the ramp and out of the chute into an external container positioned under the chute. The chute is provided with an openable lid coupled to an electric motor drive control for automatically turning off the food processor whenever the lid is elevated. This interaction of the openable lid and motor drive control facilitates cleaning or clearing of food items from the chute, without requiring the removal of the cover, thus saving time as well as protecting the user by preventing operation of the tool whenever the lid is opened.

11 Claims, 6 Drawing Figures

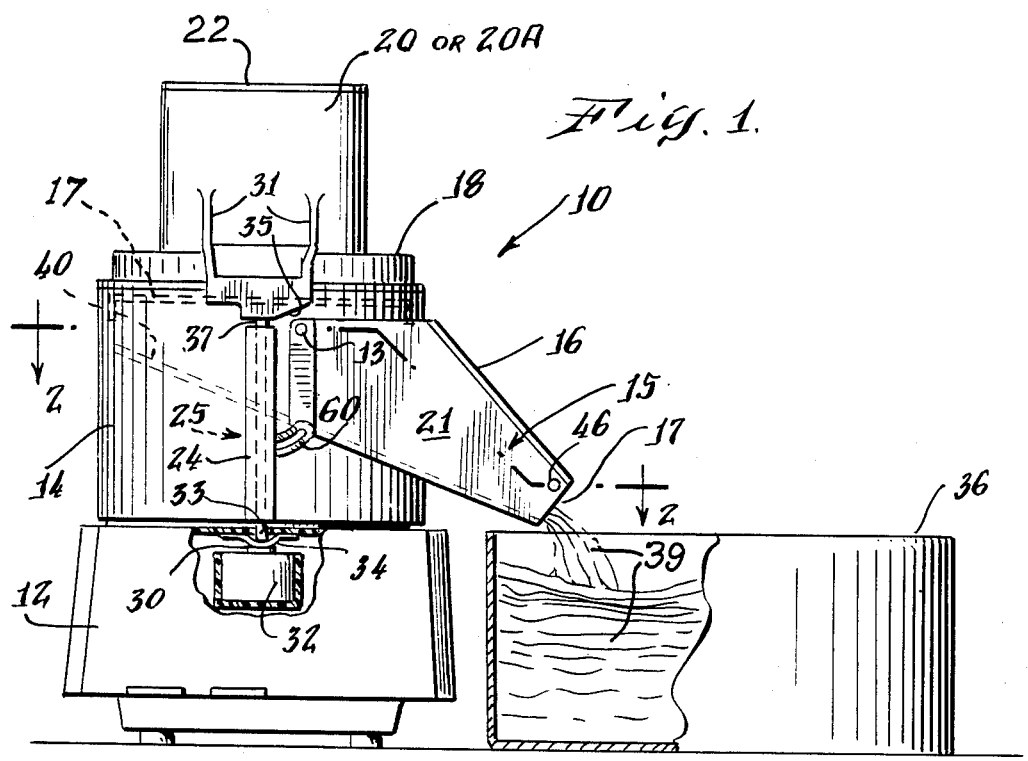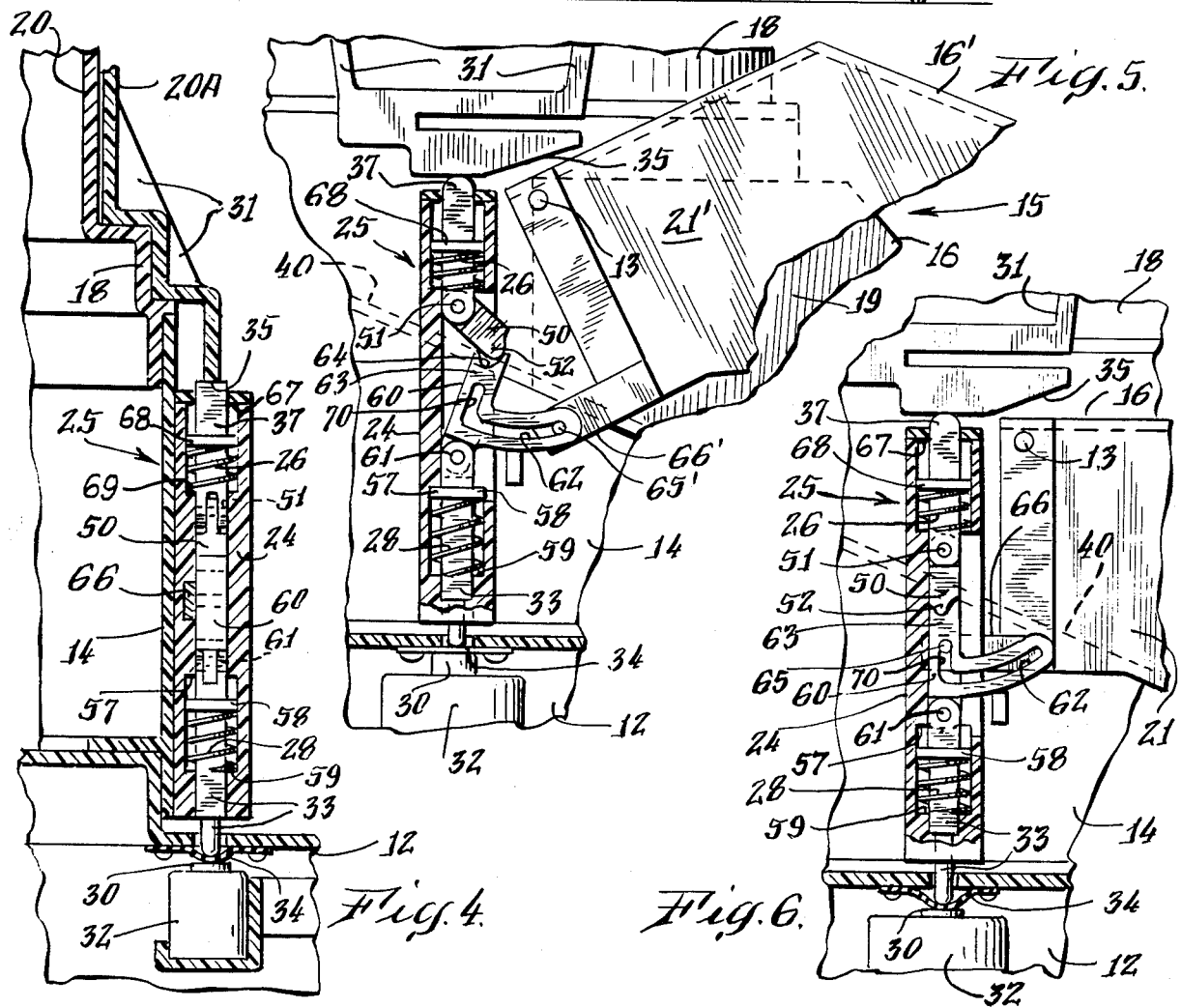

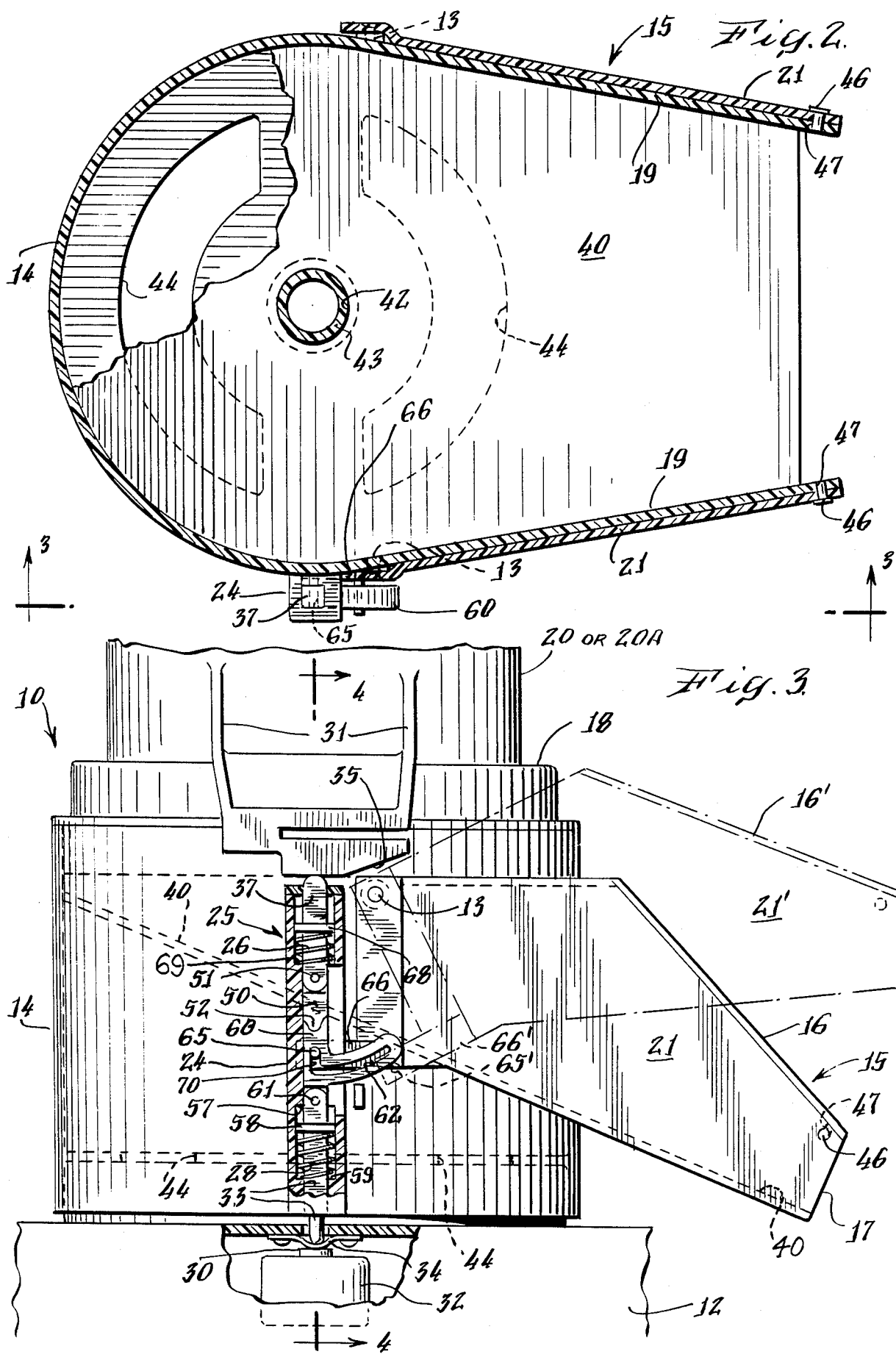

CHUTE OPERATED CONTROL FOR A FOOD PROCESSOR

BACKGROUND OF THE INVENTION

This invention relates to food processors, and more particularly to such apparatus having a chute and an inclined ramp which is mounted beneath the food processing tool on a downward slope toward the chute, whereby processed food deposited on the ramp slides down the ramp for discharge through the chute into a large nearby container, thereby increasing the food handling capabilities and capacity of the food processor. The chute includes an openable lid coupled to an electric motor drive control for facilitating the cleaning of the ramp and chute without removing the cover but at the same time protecting the user.

The present invention is applicable to food processors of the type having a working bowl with motor-driven tool drive means in the bowl with which various selected rotary food processing tools can be engaged to be driven for performing various food processing operations in accordance with the desires of the user. A removable cover is secured over the top of the bowl during use. A feed tube having a feed passageway opens downwardly into the bowl, and food items to be processed are placed in the feed tube and then are pushed down through the feed tube into the bowl by means of a removable food pusher which is adapted to slide down in the manner of a plunger through a feed tube. The food items are sliced or otherwise processed by the rotating food processing tool in the top of the bowl and are deposited and retained in the bowl.

The food processor has proved very successful in providing quick effective aid in preparing food, including slicing, shredding, grating, kneading, cutting, chopping, mixing, making French fry slices or Julienne strips, dicing, pureeing, etc. in extremely short time intervals. One of the few limitations of the food processor is that of capacity, which is limited by the size of the bowl of the particular model. Due to the operating arrangement of the food processor in which motor-driven tool drive means projects upwardly in the bowl on which various processing tools are mounted, there are of necessity certain limitations on size and capacity of the bowl. Accordingly, when a very large quantity of a food item is being processed, the bowl becomes full; the cover and tool must be removed, the bowl removed and then emptied; the bowl, tool and cover are replaced, and the processing resumed. If, for example, it is desired to make a cole slaw for 100 people, the continued acts of removing and emptying the bowl and re-mounting the bowl, tool and cover become repititious and time-consuming.

SUMMARY OF THE INVENTION

Accordingly, it is an object of this invention to provide a new and improved food processor which can provide a continuous processed food output wthout intermediate removal and emptying of the bowl.

A further object of this invention is to provide a new and improved food processor with increased food processing capacity without enlarging the capacity of the bowl and without enlarging the remaining components machine.

Still another object of this invention is to provide a new and improved food processor which is capable of preparing larger quantities of food in less time than conventional food processors of the same size and bowl capacity.

In carrying out this invention, in one illustrative embodiment thereof, a food processor of the type including a housing having an electric motor drive, a bowl mountable on the housing for enclosing a rotary food processing tool within the bowl, said tool being rotatable within said bowl by said electric motor drive, a removable cover adapted to be secured in position on the bowl and a feed tube forming a passageway for feeding food items into the bowl is provided with an improvement comprising a chute which is positioned on the bowl and which is adapted to direct food processed by the food processing tool out of the bowl. An inclined ramp is mounted in the bowl beneath the food processing tool and extends in a downward slope toward the mouth of the chute, whereby food processed by the rotary food processing tool is deposited on and slides down the ramp into the chute for discharge from the bowl into an external container of appropriate large size. An openable hinged lid is mounted on the chute with the lid being coupled to motor drive control means for automatically stopping the electric motor drive whenever the lid on the chute is in an opened position in order to enable convenient cleaning of food items from the chute without removing the cover and for protecting the user by preventing operation of the tool whenever the lid is opened.

BRIEF DESCRIPTION OF THE DRAWINGS

The invention, together with further objects, aspects, features and advantages thereof will become more fully understood from a consideration of the following description in conjunction with the accompanying drawings, which illustrate my presently preferred mode for employing this invention.

FIG. 1 is a side elevational view of a food processor embodying the present invention.

FIG. 2 is an enlarged plan sectional view taken along the line 2—2 in FIG. 1.

FIG. 3 is a side elevational view taken along the line 3—3 of FIG. 2.

FIG. 4 is a partial cross-sectional view taken along line 4—4 of FIG. 3 for showing the drive control interlock means associated with the openable lid of the chute.

FIG. 5 is an enlarged cross-sectional view similar to FIG. 3 illustrating an open lid with the interlock means which deactivates the motor drive control means for stopping the tool drive of the food processor whenever the lid of the chute is opened.

FIG. 6 is similar to FIG. 5 illustrating the reclosing of the lid and the reactivation or restoration of the motor drive control means to its original operating position.

DESCRIPTION OF THE PREFERRED EMBODIMENTS

Referring now to FIG. 1 a food processor, generally indicated by the reference number 10, is illustrated having a base housing 12 with a working bowl 14 removably mounted thereon and a chute 15 extending from the bowl. The top of the bowl 14 is closed by a cover 18 which is arranged to be engaged and fastened in secure relationship in its normal operating position on the bowl 14 whenever the food processor 10 is in operation. Standing upwardly from the cover 18 is a food receiving hopper or feed tube 20 which opens downwardly through the cover 18. The feed tube 20 is designed to receive a food pusher 22 which is manually insertable in the manner of a plunger and is employed to push food items down through the feed tube 20 into engagement with a rotary food processing tool 17 which is mounted on the motor-driven tool drive means (not shown) for rotation of the tool in the bowl 14.

The housing 12 contains a relatively powerful electric motor drive for driving the tool mounting means which extends upwardly from the housing into the working bowl 14. In order to enable operation of this motor drive there is a vertical boss 24 on the outside of the bowl defining a guideway in which is carried vertically movable drive control means referred to generally by the reference number 25. This drive control means 25 is normally urged upwardly by means of springs 26 and 28 (see FIG. 3).

When the bowl 18 is properly positioned on the housing 12, a lower plunger rod 33 of the drive control 25 is aligned with an actuating button 30 (FIGS. 1, 3 and 4) of a switch 32 which activates energization of the motor drive of the food processor 10. This switch is separated from the motor drive control 25 by a flexible liquid-tight membrane 34 for sealing the base housing 12 from entry of liquid or food materials. The top of the bowl 14 is closed by the cover 18 which is arranged to be engaged in locked relationship in its normal operating position on the bowl whenever the food processor 10 is in operation.

The cover may include a cam surface 35 (FIGS. 1, 3 and 4). Then, when the cover is held in locked engagement on the bowl 14 by placing the cover on the rim of the bowl and turning the cover to obtain a twist-lock effect, the cam surface 35 bears down on an upper plunger rod 37 of the drive control means 25 to actuate the button 30 of the switch 32, and thus activate operation of the motor drive of the food processor.

Alternatively, in food processors having a feed tube 20 with a large cross-sectional food feed passage, the feed tube is associated with a removable protective outer sleeve 20A which surrounds the feed tube 20 during operation. This outer sleeve 20A serves to assure that a food pusher 22 is used in the large food feed passage, as described and claimed in Williams U.S. Pat. No. 4,266,373. As shown in FIGS. 1, 3, and 4, the cam 35 is attached by brackets 31 on such an outer protective sleeve 20A.

The purpose of the cam 35 is to depress the control means 25 for activating the motor drive switch 32 when all of the removable components of the food processor are in their proper operating positions. These removable components include the bowl 14 and cover 18 and may also include the protective sleeve 20A which is nestable about the feed tube 20.

There are often manually operable control buttons or levers (not shown) on the front of the base housing 12. When the switch 32 is closed by depressing its button 30, a circuit is completed or activated for enabling such manual control buttons to operate the motor drive. Conversely, when the switch 32 is open, the motor drive is deenergized or deactivated and cannot be operated by the manual controls. In some food processors there are no other manual controls, in which case the switch 32 itself turns on the motor drive. In either case, when the switch 32 is open, the motor drive is deactivated and the tool 17 (FIG. 1) is not rotating. A variety of different types of food processing tools 17 may be provided which may be selectively mounted on the tool mounting means for rotation by the motor drive as may be desired by the user. The particular tool 17 forms no part of the present invention. Examples of various tools are illustrated in Sontheimer U.S. Pat. No. 3,985,304 and Williams U.S. Pat. No. 4,227,655.

Again returning to FIG. 1, the bowl 14 is provided with a chute 15 having a hinged lid 16 thereon which is pivotally mounted on the chute 15 and on the bowl 14 by hinge pins 3. The chute 15, which is mounted on the bowl and extends outwardly and downwardly therefrom, terminates in an open mouth 17 for discharging the food 39 processed by the food processor 10 into a suitable nearby external container 36. An inclined ramp 40, which will be described in detail later on, extends downwardly and out of the bowl 14, as seen in FIGS. 2 and 3, and thus this ramp 40 forms the bottom wall of the chute 15. The chute 15 has a pair of upstanding side walls 19 (FIG. 2) which are joined to opposite margins of the ramp 40 and extend vertically up above this ramp. Thus, the chute 15 has a rectangular V-shape as seen in cross section. The lid 16 includes a pair of depending side walls 21 (FIG. 2) which are joined to opposite margins of the lid and are spaced apart slightly more than the chute walls 19. Thus, the lid has an inverted rectangular V-shape as seen in cross section. The lid walls 21 overlap the chute walls 19 when the lid is closed as seen in FIG. 2.

The purpose of this chute 15 and the large container 36 positioned on the outside of the food processor 10 is to enhance the limited capacity of the bowl of food processors of the prior art. When such limited capacity bowls are filled, it is necessary to remove the bowl and empty the contents of the bowl before continuing the food processing operation.

In accordance with the present invention, the chute 15 directs the processed food 39 into the large external container 36. If this external container happens to become full, it is only necessary to stop the food processing operation for a moment to substitute a different external container, without removing the cover, bowl or any other part from the food processor 10. Different size external containers 36 may be utilized. If a considerably larger container 36 is required, the food processor 10 may be placed on a table or an elevated platform, and the chute may be directed to discharge the processed food 39 into such a large container resting on a lower support level.

In order to provide a continuous food processing operation, it is desirable that the processed food 39 continues to pour out of the chute at the same rate at which it is being processed and not accidently accumulate or build up inside the bowl 14. In other words, to provide a continuous food processing action, the food processor must not become clogged or packed with processed food. To be effective a steady flow of discharged or processed food 39 is desired to issue from the mouth 17 of the chute 15 as long as food is being fed into the feed tube 20 to be processed.

To this end, and in accordance with the present invention, a fixed, stationary inclined ramp 40 is mounted in the bowl secured to the vertical side wall of the bowl and has an opening 42 therein to receive the tubular shank 43 of a food processing tool 17. This smooth inclined ramp 40 slopes downwardly towards the mouth of the chute 15. Accordingly, food 39 processed by the rotary food processing tool 17 is deposited on the smooth ramp 40 and slides down this inclined ramp into the chute 15 for discharge from the mouth 17 into the container 36. One particular advantage of the construction of the inclined ramp 40 resides in the fact that when the tool shank 43 is mounted in the opening 42 of the inclined ramp 40, the entire area in the bowl beneath the rotary processing tool is covered. Thus, the processed food cannot enter the lower extremities of the bowl 14 which, among other things, facilitates later the cleaning of the bowl.

However, it is still desirable to keep the inclined ramp 40 clear of the processed food in order to continue the food processing operation. If the inclined ramp 40 does in fact become clogged or packed with food, it is desirable to clear or free the ramp 40 quickly so the processing can continue. One way to clean this ramp 40 would be to take off the cover 18, remove the food processing tool 14 and then to clean the inclined ramp with a flexible wiper blade tool. This cover-and-tool-removing approach is time-consuming and inhibits the purpose of the continuous food processing operation.

In accordance with the present invention, the chute 15 is provided with a hinged lid 16 which can be quickly and conveniently opened as indicated in dash-and-dot outline 16' in FIG. 3 for providing full access to the ramp 40, which facilitates the clearing or the cleaning of this inclined ramp. The lid 16 is opened by swinging upwardly its outer end near the open mouth 17 of the chute. In accordance with the present invention this lid 16 is coupled to the drive control means 25 to interrupt and prevent the operation of the motor drive when the lid 16 of the chute 15 is elevated.

To this end the motor drive control means 25 comprises four elements; namely, upper and lower plunger rods 37 and 33, respectively, an intermediate link 50 which is pivotally connected at 51 to the lower end of the upper plunger rod 37. The lower end of this intermediate link 50 has a projecting tongue or pointed surface 52 (FIG. 5) thereon. The fourth element of this drive control means 25 is a rocker arm 60 have ing an arcuate pin slot 62 therein and having a V-shaped notch 64 (FIG. 5) on an upper leg 63 which accommodates and mates with the pointed tongue 52 of the link 50. The rocker arm 60 is pivotally connected at 61 to the upper end of the lower plunger rod 33.

When these four elements 37, 50, 60 and 33 of the motor drive control means 25 are in a straight line as shown in FIG. 3, then these four elements act as one continuous push rod. Hence, depressing the upper rod 37 by the cam surface 35 serves to depress the lower rod 33 which in turn depresses the 30 for closing the switch 32. Conversely, when the rocker arm 60 and link 50 are swung away from alignment with the upper and lower plunger rods 37 and 33, then the drive control means 25 are disabled, and the lower spring 28 raises the lower plunger rod 33 for opening the switch 32.

This lower spring 28 surrounds the lower plunger rod 33 and seats down in a socket 59 in the boss 24 (as seen in FIG. 4), while the upper end of this spring presses up against an annular shoulder 58 on the rod 33. Thus, the spring 28 is always urging the plunger 33 upwardly away from the switch button 30.

There is a stop surface 57 (FIG. 4) in the boss 24 which limits the upward travel of the lower rod 33. The upper spring 26 surrounds the upper plunger rod 37, sets down in a socket 69 in the boss 24, and pushes upwardly on an annular shoulder 68 on the rod 37, thereby continuously urging this upper rod upwardly. A stop surface 67 limits the upward travel of the rod 37 when the cam 35 is absent.

The cover 16 is hinged on its upper pivot 13 connected to the wall of the bowl as shown in FIG. 2. This cover 16 has a lower extension 66 (FIG. 5) extending rearwardly from one of its side walls 21 with a pin 65 extending outwardly from this extension 66. This pin is engaged in and is movable in the arcuate pin slot 62 in the rocker arm 60.

In normal operation when the cover 18 is properly positioned on the properly mounted bowl 14, with the cam surface 35 depressing the drive control means 25 (FIG. 3) for closing the switch 30 the rotary tool 17 in the machine is able to be operated. In this condition the control elements 37, 50, 60 and 33 are in vertical alignment for depressing the switch button 30. However, if for some reason the operator opens the hinged lid 16 for access to the inclined ramp 40, then the motor drive is disabled, as will be explained. Lifting of the lid 16 into the position 16' (FIG. 5) releases the rocker arm 60 by the pin 65 on the lid extension 66 pulling forward in the slot 62 until it reaches the furthermost end of this slot. This pin 65 causes the rocker arm 60 to pivot around its pin 61 into the non-aligned position shown in FIG. 5 as the lid is started to be opened. This pin 65 causes the rocker arm 60 to pivot around its pin 61 into the non-aligned position shown in FIG. 5 as the lid is started to be opened. This pivoting motion of the rocker arm 60 causes the V-shaped slot 64 in the upper arm 63 of the rocker arm 60 to move laterally, thereby moving the pointed tonuge 52 of the link 50 for pivoting the link 50 outwardly toward the lid. The resultant lateral pivoted positions of the rocker arm 60 and the link 50 as shown in FIG. 5 provides a slack or discontinuity in the motor drive control means 25 for allowing withdrawal of the lower rod 33 away from actuating the switch 32 thus disabling the motor drive, making it safe to access the ramp 40.

After the ramp 40 has been cleaned, the lid 16 may be swung shut, at which point the pin 65 on the rearward extension 66 of the lid 16 travels back along the pin slot 62 of the rocker arm 60 for returning this rocker arm to its initial position as shown in FIGS. 3 or 5. At the same time, the upper V-shaped notch 64 is moving the tongue 52 of the link 50 back into alignment, such that the four elements of the motor drive control 25 are again vertically aligned for actuating the switch 32.

The arcuate portion of the pin slot 62 is approximately concentric about the hinge pin 13 when the rocker arm 60 is swung over as shown in FIG. 5 for allowing the pin 65 to slide freely along the slot 62 to its open-lid position. When the lid 16 is in its open position 16' (FIGS. 3 and 5) the extension 66 and pin 65 moves to their open-lid positions 66' and 65' (FIG. 3). There is a vertical region (FIG. 6) of this pin slot. This vertical slot region 70 allows the rocker arm to slide up and down freely when the four elements 37, 50, 60 and 33 are vertically aligned as shown in FIG. 5. When the lid 16 is closed, as shown at 16 in FIG. 3, a detent stud element 46 (FIG. 2) enters a notch 47 in the side wall of the chute 15. Below the inclined ramp 40 of the bottom wall 45 of the bowl is cut away at 44 for providing access for washing of the bowl.

Thus, a food processor is provided which can be operated continuously without removing the cover, the rotary tool or the bowl. By providing an inclined ramp which is stationarily mounted within the bowl and covers all the space under the rotary tool within the bowl, all of the processed food is directed out of the chute. No food can become lodged or deposited in the bowl below the ramp. However, if it does become desirable to clean the ramp, the operation may be done quickly and easily without removing the cover, tool or bowl. The hinged lid is easily raised, which breaks the aligned chain of elements of the motor drive control means thereby disabling the motor drive while the cleaning operation may be undertaken. When the inclined ramp is quickly wiped clean, the lid is swung closed thereby again aligning the elements of the motor drive control so that the food processing may continue with very brief interruptions.

Since other changes and modifications varied to fit particular operating requirements and environments will be understood by those skilled in the art, the invention is not considered limited to the example chosen for purposes of illustration, and includes all changes and modifications which do not constitute a departure from the true spirit and scope of this invention as defined in the following claims and reasonable equivalents of the claimed elements.

What is claimed is:

1. In a food processor of the type including a housing having an electric motor drive, a bowl mountable on said housing for enclosing a rotary food processing tool within said bowl by said electric motor drive, removable components including a cover adapted to be secured in poisition on said bowl, a feed tube forming a passageway for feeding food items into said bowl, the improvement comprising:
   a chute having a first end positioned on said bowl and a mouth adapted to direct food processed by said food processing tool out of said bowl,
   a fixed inclined ramp mounted in said bowl beneath said food processing tool and extending on a downward slope toward the mouth of said chute for causing food processed by said rotary food processing tool to be deposited on said inclined ramp for sliding down said ramp into said chute for discharge from said bowl,
   an openable hinged lid having a first end mounted for pivotal movement on said bowl and a second end forming a portion of the mouth of said chute, said lid normally covering said chute and being openable by swinging said second end of said lid away from said mouth, and
   motor drive control means coupled to said lid for disabling said motor drive when said lid on said chute is swung open for providing access to said inclined ramp for wiping food materials off of said ramp.

2. In a food processor, the improvements set forth in claim 1, in which:
   said motor drive control means normally enable operation of said motor drive by activating the motor drive when said control means is depressed by a cam indicating that all of the removable components of the food processor are in their proper operating positions,
   said control means normally being movable vertically downwardly by such cam for activating said motor drive,
   said motor drive control means including a plurality of moveable vertically aligned elements, at least one element of which may be moved laterally,
   said lid being coupled to said one element for causing the opening of said lid to move said one element laterally for interrupting the vertical alignment of said drive control means for preventing operation of said electric motor drive when said lid is opened.

3. In a food processor, the improvements set forth in claim 1 in which:
   said motor drive control means comprises a plurality of movable elements normally disposed in vertical alignment, said vertically aligned elements being moved downwardly by a cam indicating that all of the removable components of the food processor are in their proper operating positions for enabling operation of said motor drive, said lid being mechanically coupled to at least one of said vertically aligned elements for moving said one element out of vertical alignment with the other elements of said vertically aligned elements for thereby disabling the operation of said motor drive.

4. In a food processor, the improvement set forth in claim 3 in which:
   said one element of said plurality of elements comprises a rocker arm having an arcuate slot therein,
   said lid has a pin extending therefrom riding in said arcuate slot, and
   the opening of said lid moves said pin in said slot for pivoting said rocker arm out of its vertically aligned position and for holding said rocker arm in its non-aligned position until said lid is again closed for preventing operation of the motor drive until the lid is closed.

5. In a food processor, the improvement set forth in claim 4 in which:
   said rocker arm has an upper extension thereon which is vertically aligned with said plurality of elements when said lid is closed,
   one of said elements is a pivoted link positioned contiguous to said upper extension of said rocker arm,
   said link having a lower surface in contact with said upper extension, and
   said pivoting of said rocker arm out of its vertically aligned position by the opening of said lid pushes said lower surface for pivoting said link out of vertical alignment with the other elements of said control means.

6. In a food processor the improvement set forth in claim 5, in which:
   said surface on said link has a tongue,
   said upper extension of said rocker arm has a V-shaped notch therein, and
   said tongue engages in said V-shaped notch when said elements are vertically aligned.

7. In a food processor of the type including a base housing having an electric motor drive, a removable bowl mountable on said base housing for enclosing a rotary food processing tool within said bowl, said bowl being rotatable within said bowl by said electric motor drive, removable components including a cover adapted to be secured in a position on said bowl, a feed tube forming a passageway for feeding food items into said bowl for processing by the rotating tool, and activating means in said base housing for preventing operation of said motor drive unless said activating means is actuated, the improvement comprising:
   a chute havinig a bottom surface and an open mouth projecting laterally from said bowl for directing food processed by said food processing tool out of the open mouth of said chute,
   a fixed inclined ramp mounted in said bowl beneath said food processing tool extending on a downward incline and forming said bottom surface of said chute, a movable lid normally covering said chute, said lid being opeable for providing access to said inclined ramp, motor drive control means mounted on said bowl including at least three elements including uppermost, intermediate, and lowermost elements normally aligned in end-to-end relationship extending down along the bowl and said lowermost element being aligned with said activating means when the bowl is properly mounted on the base housing, said aligned elements being moved downwardly by depressing said uppermost element when said removable components of the food processor are in their proper operating position for causing said lowermost element to actuate said activating means, and said movable lid being mechanically coupled to an intermediate one of said aligned elements for moving said intermediate element laterally out of alignment with said uppermost and lowermost elements when the lid is opened for preventing activation of said activating means when the lid is open for preventing operation of the motor drive.

8. In a food processor, the improvement as claimed in claim 7, in which:

said movable lid having a first end which is hinged on said bowl and an outer end for allowing the lid to be opened by swinging up said outer end of said lid near said open mouth, said lid including side walls straddling the chute, and one of said side walls at a location generally below the hinge is mechanically coupled to said intermediate element.

9. In a food processor, the improvement as claimed in claim 7 or 8, in which:

said control means includes four element, said uppermost and lowermost elements and first and second intermediate elements, said uppermost element is pivotally connected to said first intermediate element forming a first pivoted link having a free end, said second intermediate element is pivotally connected to said lowermost element forming a second pivoted link having a free end, and said lid is mechanically coupled to one of said pivoted links for swinging said first and second pivoted links out of alignment with said uppermost and lowermost elements whenever the lid is opened for preventing operation of the motor drive.

10. In a food processor, the improvement as claimed in claim 9, in which:

said second pivoted link has a V-shaped notch in its free end, and said first pivoted link has a tongue on its free end engaging in said notch.

11. In a food processor, the improvement as claimed in claim 8, in which:

said one of the side walls of the lid is connected by a rigid member to a pin, and said intermediate element has a slot therein in which said pin is engaged for pulling said intermediate element out of alignment as the lid is started to be opened and for pushing said intermediate element back into alignment as the lid is nearing full closure.

* * * * *